(12) United States Patent
Miao et al.

(10) Patent No.: US 12,262,408 B2
(45) Date of Patent: Mar. 25, 2025

(54) INFORMATION TRANSMISSION METHOD, CONFIGURATION METHOD, TERMINAL AND NETWORK DEVICE

(71) Applicant: DATANG MOBILE COMMUNICATIONS EQUIPMENT CO., LTD., Beijing (CN)

(72) Inventors: Jinhua Miao, Beijing (CN); Pierre Bertrand, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 633 days.

(21) Appl. No.: 17/292,412

(22) PCT Filed: Aug. 16, 2019

(86) PCT No.: PCT/CN2019/100974
§ 371 (c)(1),
(2) Date: May 7, 2021

(87) PCT Pub. No.: WO2020/093750
PCT Pub. Date: May 14, 2020

(65) Prior Publication Data
US 2022/0015117 A1    Jan. 13, 2022

(30) Foreign Application Priority Data

Nov. 8, 2018  (CN) .......................... 201811327522.7
Jan. 17, 2019  (CN) .......................... 201910043926.1

(51) Int. Cl.
*H04W 72/566* (2023.01)

(52) U.S. Cl.
CPC ............................. *H04W 72/569* (2023.01)

(58) Field of Classification Search
CPC ... H04W 72/569; H04W 72/21; H04W 72/56; H04W 72/23
See application file for complete search history.

(56) References Cited

U.S. PATENT DOCUMENTS

| 2010/0034158 | A1 | 2/2010 | Meylan |
| 2015/0223235 | A1 | 8/2015 | Hwang et al. |

(Continued)

FOREIGN PATENT DOCUMENTS

| CN | 101741707 A | 6/2010 |
| CN | 102150452 A | 8/2011 |

(Continued)

OTHER PUBLICATIONS

Second European Office Action for European Patent Application 19882452.6 issued on Oct. 17, 2022.

(Continued)

*Primary Examiner* — Dinh Nguyen
(74) *Attorney, Agent, or Firm* — Ladas & Parry, LLP

(57) ABSTRACT

An information transmission method, an information configuration method, a terminal, and a network device are provided. The information transmission method includes receiving priority indication information transmitted by a network device, and instructing a physical layer to send a target SR on a target PUCCH resource according to the priority indication information; wherein the priority indication information includes one of following: first information, the first information being logical channel priority information; second information for indicating a priority of SR configuration; third information for indicating relationship between a priority of SR configuration and a priority of UL-SCH transmission.

12 Claims, 4 Drawing Sheets

(56) References Cited

U.S. PATENT DOCUMENTS

| | | | |
|---|---|---|---|
| 2015/0223264 A1 | 8/2015 | Cheng et al. | |
| 2016/0174243 A1* | 6/2016 | Park | H04W 72/23 |
| | | | 370/329 |
| 2018/0014323 A1 | 1/2018 | Huang et al. | |
| 2018/0199343 A1 | 7/2018 | Deogun et al. | |
| 2018/0279331 A1* | 9/2018 | Shaheen | H04W 72/23 |
| 2018/0279353 A1 | 9/2018 | Shaheen et al. | |
| 2019/0281618 A1 | 9/2019 | Zhao et al. | |
| 2021/0014880 A1* | 1/2021 | Jiang | H04W 24/08 |

FOREIGN PATENT DOCUMENTS

| | | |
|---|---|---|
| CN | 106954277 A | 7/2017 |
| CN | 108024341 A | 5/2018 |
| CN | 108476510 A | 8/2018 |
| EP | 2862402 A1 | 4/2015 |
| WO | 2013/186594 A1 | 12/2013 |
| WO | 2014059606 A | 4/2014 |
| WO | 2018082467 A | 5/2018 |

OTHER PUBLICATIONS

"Intra-UE Prioritization and Multiplexing for IIoT" 3GPP TSG-RAN WG2 Meeting 104 R2-1816364, Spokane, USA, Nov Source: CATT, Agenda Item: 11.7.3.

"SR procedure in NR", R2-1710109 (Revision of R2-1708266), 3GPP TSG-RAN2 Meeting #99bis, Prague, Czech Republic, Oct. 9-13, 2017, all pages.

"Consideration on SR transmission occasion overlap with a UL-SCH Resource", R2-1804877, 3GPP TSG-RAN2 NR #101bis, Sanya, China, Apr. 16-Apr. 20, 2018, all pages.

International Search Report from PCT/CN2019/100974, dated Oct. 28, 2019, with English translation from WIPO, all pages.

Written Opinion of the International Searching Authority from PCT/CN2019/100974, dated Oct. 28, 2019, with English translation from WIPO, all pages.

International Preliminary Report on Patentability from PCT/CN2019/100974, dated May 11, 2021, with English translation from WIPO, all pages.

Extended European Search Report from EP app. No. 19882452.6, dated Dec. 7, 2021, all pages.

First Office Action and Search Report from CN app. No. 201910043926.1, dated Nov. 24, 2021, with English translation from Global Dossier, all pages.

Qualcomm Incorporated, "Enhancements to SR in NR", R2-1704900, 3GPP TSG-RAN WG2 Meeting #98, Hangzhou, China, May 15-19, 2017, all pages.

CATT, "SR configuration, mapping and transmission for CA and BWPs cases", R2-1710296, 3GPP TSG-RAN WG2 #99bis, Prague, Czech Republic, Oct. 9-13, 2017, all pages.

Nokia, "Email discussion summary on [99bis#38][NR UP/MAC]—SR open Issues", R2-1712973, 3GPP TSG-RAN WG2 #100, Reno, USA, Nov. 27-Dec. 1, 2017, all pages.

Zhang et al., "Improvement of BSR and SR delivery in LTE systems", Study on Optical Communications, vol. 172, Aug. 2012, pp. 56-59, with machine English translation from Google Translate.

Duan et al., "An Improved Approach of Sending BSR and SR Based on MAC Layer in LTE System", 2011 International Conference on Business Computing and Global Informatization, pp. 520-523.

Extended European search report from corresponding European Patent Application No. 24173779.0 dated Jun. 14, 2024.

* cited by examiner

INFORMATION TRANSMISSION METHOD, CONFIGURATION METHOD, TERMINAL AND NETWORK DEVICE

CROSS REFERENCE TO RELATED APPLICATIONS

This application is a U.S. national phase application of a PCT Application No. PCT/CN2019/100974 filed on Aug. 16, 2019, which claims a priority to Chinese Patent Application No. 201811327522.7 filed in China on Nov. 8, 2018 and a priority to Chinese Patent Application No. 201910043926.1 filed in China on Jan. 17, 2019, the disclosures of which are incorporated in their entireties by reference herein.

TECHNICAL FIELD

The present disclosure relates to the technical field of communications application, in particular, relates to an information transmission method, an information configuration method, a terminal and a network device.

BACKGROUND

If a User Equipment (UE) has no uplink data to transmit, a network device does not need to allocate uplink resources for the UE, to avoid resource waste. Therefore, the UE needs to inform the network device of whether the UE has uplink data to be transmitted, so that the network device can decide whether to allocate uplink resources to the UE. For this, New Radio (NR) provides a Scheduling Request (SR) mechanism.

The UE informs, through the SR, the network device of whether uplink resources are required by the UE for Uplink-Shared Channel (UL-SCH) transmission, but does not inform the network device of how much uplink data needs to be transmitted which is reported through a Buffer Status Report (BSR). After the network device receives the SR, an amount of uplink resources allocated to the UE depends on implementation at the network device, and in general, the network device allocates at least enough resources for the UE to send the BSR.

Because the network device does not know when the UE needs to send uplink data, that is, does not know when the UE will send the SR. Therefore, the network device needs to detect, on allocated SR resources, whether any SR is reported.

Considering that different services have different delay requirements, a terminal is allowed to configure a plurality of sets of SR resources in a 5G system, and SR resources in the sets of SR resources are selected according to different services, and mapping relationship between each logical channel and the SR resources can be configured.

The number of SR configurations configured for a Media Access Control (MAC) entity may be 0, 1 or more. One SR configuration includes a plurality of Bandwidth Parts (BWPs) and a series of Physical Uplink Control Channel (PUCCH) resources on a cell. For one logical channel, at most one PUCCH resource can be configured on each BWP.

Each SR configuration corresponds to one or more logical channels. Each logical channel may correspond to 0 or 1 SR. These correspondences are configured by a Radio Resource Control (RRC) signaling.

Here, it is considered that a SR to be transmitted after being triggered by the BSR is a pending SR.

The UE can only send an SR on the PUCCH.

The network device may allocate dedicated SR resources for each UE to transmit the SR. For each SR resource, the SR resource is periodic, and occurs once every n slots or symbols.

FIG. 1 is a schematic diagram of a transmission process of a scheduling request (SR). A specific process thereof is as follows.

The UE triggers a scheduling request (SR) after data arrives, and sends the SR on the next adjacent available SR resource, and then the UE receives an Uplink (UL) grant, and the data, generally referring to a data packet including the BSR, is transmitted on an Uplink Shared Channel (UL-SCH) indicated by the UL grant.

In the related art, as shown in FIG. 2, if transmission of the SR and transmission of the UL-SCH collide together or overlap in time, the UE may select to transmit the transmission of UL-SCH first, and then transmit the triggered SR on the next available SR resource. However, this may cause a problem that an SR of some emergency services is delayed for transmission.

SUMMARY

An objective of the present disclosure is to provide an information transmission method, an information configuration method, a terminal, and a network device, so as to solve the problem in the related art that when a SR resource overlaps with a UL-SCH transmission resource, transmission of an SR of some emergency services is delayed.

In order to achieve the above objective, an information transmission method performed by a terminal is provided in the embodiments of the present disclosure. The method includes: receiving priority indication information sent by a network device; instructing a physical layer to send a target Scheduling Request (SR) on a target Physical Uplink Control Channel (PUCCH) resource according to the priority indication information; wherein the priority indication information includes one of following: first information, the first information being logical channel priority information; second information for indicating a priority of SR configuration; third information for indicating relationship between a priority of SR configuration and a priority of Uplink Shared Channel (UL-SCH) transmission.

Instructing the physical layer to send the target SR on the target PUCCH resource according to the priority indication information includes: in a case that a first PUCCH resource in SR configuration corresponding to a pending SR overlaps with an UL-SCH transmission resource, instructing the physical layer to transmit the SR on the first PUCCH resource, if a priority of a target object is determined to be higher than the priority of UL-SCH transmission according to the priority indication information.

Instructing the physical layer to send the target SR on the target PUCCH resource according to the priority indication information includes: in a case that a second PUCCH resource in SR configuration corresponding to a pending SR overlaps with an UL-SCH transmission resource, instructing the physical layer to transmit the SR on a next available third PUCCH resource adjacent to the second PUCCH resource, if a priority of a target object is determined to be lower than the priority of UL-SCH transmission according to the priority indication information.

The method further includes in a case that a third PUCCH resource in SR configuration corresponding to a pending SR overlaps with an UL-SCH transmission resource, instructing the terminal to transmit the UL-SCH on the UL-SCH transmission resource, if a priority of a target object is determined to be lower than the priority of UL-SCH transmission according to the priority indication information.

The priority of the target object includes a priority of SR configuration, priorities of one or more logical channels corresponding to SR configuration, or a priority of a logical channel for triggering a SR.

Receiving the priority indication information sent by the network device includes: receiving the priority indication information sent through a Radio Resource Control (RRC) signaling or a Downlink Control Information (DCI) indication signaling or a Medium Access Control (MAC) control element by the network device.

The priority indication information includes the second information, and the second information includes a priority control element, the priority control element includes a priority value for indicating whether the priority of SR configuration is high or low.

The priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

The priority indication information includes the first information, the first information is logical channel priority information. Instructing the physical layer to transmit the SR on the first PUCCH resource if the priority of the target object is determined to be higher than the priority of UL-SCH transmission according to the priority indication information includes: instructing the physical layer to transmit the SR on the first PUCCH resource if priorities of one or more logical channels corresponding to SR configuration of a pending SR are higher than the priority of a logical channel for acquiring UL-SCH transmission data.

The priority indication information includes the second information, the second information includes a priority control element, and the priority control element includes a priority value for indicating whether the priority of SR configuration is high or low; instructing the physical layer to transmit the SR on the first PUCCH resource if the priority of the target object is determined to be higher than the priority of UL-SCH transmission according to the priority indication information includes: instructing the physical layer to transmit the SR on the first PUCCH resource if the priority of SR configuration represented by the priority value is higher than the priority of a logical channel for acquiring UL-SCH transmission data.

The priority indication information includes the third information, the third information includes indication information for indicating the relationship between the priority of SR configuration and the priority of UL-SCH transmission; instructing the physical layer to transmit the SR on the first PUCCH resource if the priority of the target object is determined to be higher than the priority of UL-SCH transmission according to the priority indication information includes: instructing the physical layer to transmit the SR on the first PUCCH resource, if the indication information indicates that the priority of SR configuration is higher than the priority of UL-SCH transmission.

The priority indication information includes the third information, the third information includes a flag control element for identifying that the priority of SR configuration is higher than the priority of UL-SCH transmission; instructing the physical layer to transmit the SR on the first PUCCH resource if the priority of the target object is determined to be higher than the priority of UL-SCH transmission according to the priority indication information includes: instruct the physical layer to transmit the SR on the first PUCCH resource, if the flag control element is determined to exist.

The priority indication information includes the third information, the third information includes first flag information for indicating that the priority of SR configuration is higher than the priority of UL-SCH transmission; instructing the physical layer to transmit the SR on the first PUCCH resource if the priority of the target object is determined to be higher than the priority of UL-SCH transmission according to the priority indication information includes: instructing the physical layer to transmit the SR on the first PUCCH resource, if the first flag information is determined to exist.

The priority indication information includes the third information, the third information includes second flag information for indicating whether the priority of SR configuration is higher than the priority of UL-SCH transmission; instructing the physical layer to transmit the SR on the first PUCCH resource if the priority of the target object is determined to be higher than the priority of UL-SCH transmission according to the priority indication information includes: instructing the physical layer to transmit the SR on the first PUCCH resource if the second flag information is determined to indicate that the priority of SR configuration is higher than the priority of UL-SCH transmission.

In order to achieve the above objective, an information configuration method performed by a network device is further provided in the embodiments of the present disclosure. The method includes: configuring priority indication information for a terminal; wherein the priority indication information includes one of following: first information, the first information being logical channel priority information; second information for indicating a priority of SR configuration; third information for indicating relationship between a priority of SR configuration and a priority of Uplink Shared Channel (UL-SCH) transmission.

The priority indication information includes the second information; the second information includes a priority control element, the priority control element includes a priority value for indicating whether the priority of SR configuration is high or low.

The priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

The method further includes sending the priority indication information to the terminal.

Sending the priority indication information to the terminal includes: sending the priority indication information to the terminal through a Radio Resource Control (RRC) signaling or a Downlink Control Information (DCI) indication signaling or a Medium Access Control (MAC) control element.

In order to achieve the above objective, a terminal is further provided in the embodiments of the present disclosure. The terminal includes: a transceiver, a storage, a processor and a program stored on the storage and executable by the processor, wherein, the transceiver is configured to receive priority indication information sent by a network device; the processor is configured to read the program in the storage and perform the following step of instructing a physical layer to send a target Scheduling Request (SR) on a target Physical Uplink Control Channel (PUCCH) resource according to the priority indication information; the priority indication information includes one of following: first information, the first information being logical channel priority information; second information for indicating a priority of SR configuration; third information for indicating relationship between a priority of SR configuration and a priority of Uplink Shared Channel (UL-SCH) transmission.

The processor is further configured to: in a case that a first PUCCH resource in SR configuration corresponding to a pending SR overlaps with an UL-SCH transmission resource, instruct the physical layer to transmit the SR on the first PUCCH resource, if a priority of a target object is determined to be higher than the priority of UL-SCH transmission according to the priority indication information.

The processor is further configured to: in a case that a second PUCCH resource in SR configuration corresponding to a pending SR overlaps with an UL-SCH transmission resource, instruct the physical layer to transmit the SR on a next available third PUCCH resource adjacent to the second PUCCH resource, if a priority of a target object is determined to be lower than the priority of UL-SCH transmission according to the priority indication information.

The processor is further configured to: in a case that a third PUCCH resource in SR configuration corresponding to a pending SR overlaps with an UL-SCH transmission resource, instruct the terminal to transmit the UL-SCH on the UL-SCH transmission resource, if a priority of a target object is determined to be lower than the priority of UL-SCH transmission according to the priority indication information.

The priority of the target object includes a priority of SR configuration, priorities of one or more logical channels corresponding to SR configuration, or a priority of a logical channel for triggering a SR.

The transceiver is further configured to: receive the priority indication information sent through a Radio Resource Control (RRC) signaling or a Downlink Control Information (DCI) indication signaling or a Medium Access Control (MAC) control element by the network device.

The priority indication information includes the second information, and the second information includes a priority control element, the priority control element includes a priority value for indicating whether the priority of SR configuration is high or low.

The priority indication information includes the third information, and the third information includes one of following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

The priority indication information includes the first information, the first information is logical channel priority information; the processor is further configured to instruct the physical layer to transmit the SR on the first PUCCH resource if priorities of one or more logical channels corresponding to SR configuration of a pending SR are higher than the priority of a logical channel for acquiring UL-SCH transmission data.

The priority indication information includes the second information, the second information includes a priority control element, and the priority control element includes a priority value for indicating whether the priority of SR configuration is high or low; the processor is further configured to instruct the physical layer to transmit the SR on the first PUCCH resource if the priority of SR configuration represented by the priority value is higher than the priority of a logical channel for acquiring UL-SCH transmission data.

The priority indication information includes the third information, the third information includes indication information for indicating the relationship between the priority of SR configuration and the priority of UL-SCH transmission; the processor is further configured to instruct the physical layer to transmit the SR on the first PUCCH resource, if the indication information indicates that the priority of SR configuration is higher than the priority of UL-SCH transmission.

The priority indication information includes the third information, the third information includes a flag control element for identifying that the priority of SR configuration is higher than the priority of UL-SCH transmission; the processor is further configured to instruct the physical layer to transmit the SR on the first PUCCH resource, if the flag control element is determined to exist.

The priority indication information includes the third information, the third information includes first flag information for indicating that the priority of SR configuration is higher than the priority of UL-SCH transmission; the processor is further configured to instruct the physical layer to transmit the SR on the first PUCCH resource, if the first flag information is determined to exist.

The priority indication information includes the third information, the third information includes second flag information for indicating whether the priority of SR configuration is higher than the priority of UL-SCH transmission; the processor is further configured to instruct the physical layer to transmit the SR on the first PUCCH resource, if the second flag information is determined to indicate that the priority of SR configuration is higher than the priority of UL-SCH transmission.

In order to achieve the above objective, a terminal is further provide in the embodiments of the present disclosure. The terminal includes: a reception module, configured to receive priority indication information sent by a network device; a transmission module, configured to instruct a physical layer to send a target Scheduling Request (SR) on a target Physical Uplink Control Channel (PUCCH) resource according to the priority indication information; wherein the priority indication information includes one of following: first information, the first information being logical channel priority information; second information for indicating a priority of SR configuration; third information for indicating relationship between a priority of SR configuration and a priority of Uplink Shared Channel (UL-SCH) transmission.

The transmission module includes a first transmission unit. The first transmission unit is configured to, in a case that a first PUCCH resource in a SR configuration corresponding to a pending SR overlaps with an UL-SCH transmission resource, instruct the physical layer to transmit the SR on the first PUCCH resource if a priority of a target object is determined to be higher than the priority of UL-SCH transmission according to the priority indication information.

The transmission module includes a second transmission unit. The second transmission unit is configured to, in a case that a second PUCCH resource in a SR configuration corresponding to a pending SR overlaps with an UL-SCH transmission resource, instruct the physical layer to transmit the SR on a next available third PUCCH resource adjacent to the second PUCCH resource if a priority of a target object is determined to be lower than the priority of UL-SCH transmission according to the priority indication information.

The transmission module includes a third transmission unit. The third transmission unit is configured to, in a case that a third PUCCH resource in a SR configuration corresponding to a pending SR overlaps with an UL-SCH transmission resource, instruct the terminal to transmit the UL-SCH on the UL-SCH transmission resource if a priority of a target object is determined to be lower than the priority of UL-SCH transmission according to the priority indication information.

The priority of the target object includes a priority of SR configuration, priorities of one or more logical channels corresponding to SR configuration, or a priority of a logical channel for triggering a SR.

The reception module includes a first reception unit. The first reception unit is configured to receive the priority indication information sent through a radio resource control (RRC) signaling or a downlink control information (DCI) indication signaling or a medium access control (MAC) control element by a network device.

The priority indication information includes the second information; the second information includes a priority control element, the priority control element includes a priority value for indicating whether the priority of SR configuration is high or low.

The priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

The priority indication information includes the first information, the first information is logical channel priority information; the first transmission unit is further configured to instruct the physical layer to transmit the SR on the first PUCCH resource if priorities of one or more logical channels corresponding to SR configuration of a pending SR are higher than the priority of a logical channel for acquiring UL-SCH transmission data.

The priority indication information includes the second information, the second information includes a priority control element, and the priority control element includes a priority value for indicating whether the priority of SR configuration is high or low; the first transmission unit is further configured to instruct the physical layer to transmit the SR on the first PUCCH resource if the priority of SR configuration represented by the priority value is higher than the priority of a logical channel for acquiring UL-SCH transmission data.

The priority indication information includes the third information, the third information includes indication information for indicating the relationship between the priority of SR configuration and the priority of UL-SCH transmission; the first transmission unit is further configured to instruct the physical layer to transmit the SR on the first PUCCH resource, if the indication information indicates that the priority of SR configuration is higher than the priority of UL-SCH transmission.

The priority indication information includes the third information, the third information includes a flag control element for identifying that the priority of SR configuration is higher than the priority of UL-SCH transmission; the first transmission unit is further configured to instruct the physical layer to transmit the SR on the first PUCCH resource, if the flag control element is determined to exist.

The priority indication information includes the third information, the third information includes first flag information for indicating that the priority of SR configuration is higher than the priority of UL-SCH transmission; the first transmission unit is further configured to instruct the physical layer to transmit the SR on the first PUCCH resource, if the first flag information is determined to exist.

The priority indication information includes the third information, the third information includes second flag information for indicating whether the priority of SR configuration is higher than the priority of UL-SCH transmission; the first transmission unit is further configured to instruct the physical layer to transmit the SR on the first PUCCH resource, if the second flag information is determined to indicate that the priority of SR configuration is higher than the priority of UL-SCH transmission.

In order to achieve the above objective, a computer readable storage medium is further provided in the embodiments of the present disclosure. The computer readable storage medium includes a computer program stored on the computer readable storage medium, wherein when the computer program is executed by a processor, the processor implements the steps of the information transmission method described above.

In order to achieve the above objective, a network device is further provided in the embodiments of the present disclosure. The network device includes a transceiver, a storage, a processor and a program stored in the storage and executable by the processor, wherein the processor is configured to read the program in the storage to perform the following step: configuring priority indication information for a terminal; wherein the priority indication information includes one of following: first information, the first information being logical channel priority information; second information for indicating a priority of SR configuration; third information for indicating relationship between a priority of SR configuration and a priority of Uplink Shared Channel (UL-SCH) transmission.

The priority indication information includes the second information; the second information includes a priority control element, the priority control element includes a priority value for indicating whether the priority of SR configuration is high or low.

The priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

The transceiver is configured to send the priority indication information to the terminal.

The transceiver is further configured to send the priority indication information to the terminal through a Radio Resource Control (RRC) signaling or a Downlink Control Information (DCI) indication signaling or a Medium Access Control (MAC) control element.

In order to achieve the above objective, a network device is further provided in the embodiments of the present disclosure. The network device includes a configuration module, configured to configure priority indication information for a terminal; wherein the priority indication information includes one of following: first information, the first information being logical channel priority information; second information for indicating a priority of SR configuration; third information for indicating relationship between a priority of SR configuration and a priority of Uplink Shared Channel (UL-SCH) transmission.

The priority indication information includes the second information; the second information includes a priority control element, the priority control element includes a priority value for indicating whether the priority of SR configuration is high or low.

The priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

The network device further includes a sending module configured to send the priority indication information to the terminal.

The sending module includes a sending unit configured to send the priority indication information to the terminal through a Radio Resource Control (RRC) signaling or a Downlink Control Information (DCI) indication signaling or a Medium Access Control (MAC) control element.

In order to achieve the above objective, a computer readable storage medium is further provided in the embodiments of the present disclosure. The computer readable storage medium includes a computer program stored on the computer readable storage medium, wherein when the computer program is executed by a processor, the processor implements the steps of the information configuration method described above.

The above technical solutions of the present disclosure have at least the following beneficial effects.

In the above technical solutions of the embodiments of the present disclosure, by receiving priority indication information transmitted by a network device, instructing a physical layer, according to the priority indication information, to transmit a target SR on a target PUCCH resource, wherein the priority indication information includes one of the following information: first information which is logical channel priority information, second information for indicating a priority of a SR configuration, and third information for indicating a relationship between the priority of SR configuration and a priority of UL-SCH transmission, the SR can be transmitted in time, thereby avoiding a situation that a SR of some emergency services is delayed in transmission due to overlap of a SR resource with a UL-SCH transmission resource.

DETAILED DESCRIPTION

In order to make technical problems, technical solutions and advantages to be solved by the present disclosure more clear, a detailed description will be given below with reference to drawings and specific embodiments.

Figure 1:
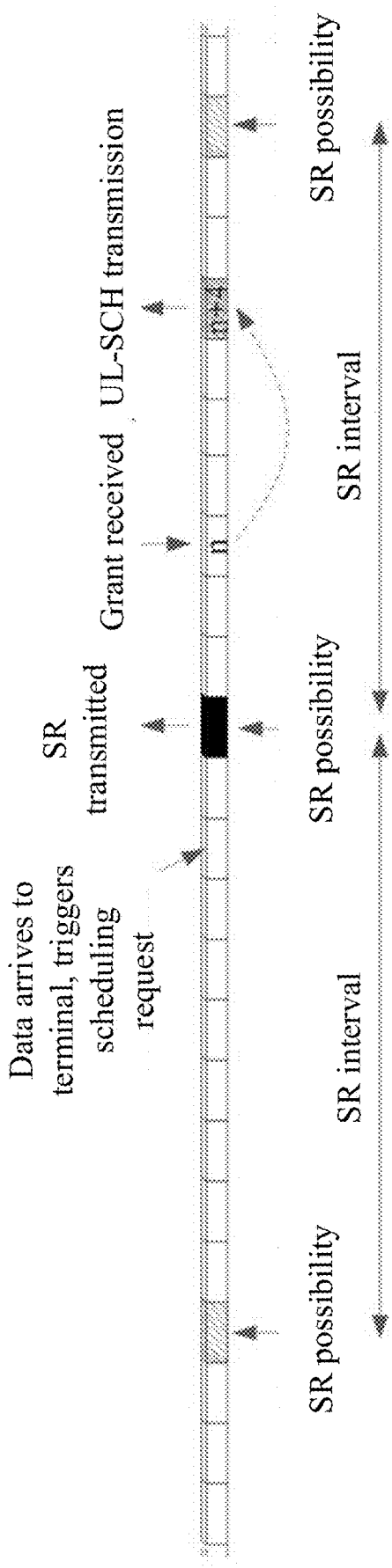
FIG. 1 is a schematic diagram of a transmission process of a scheduling request in the related art.
Figure 2:
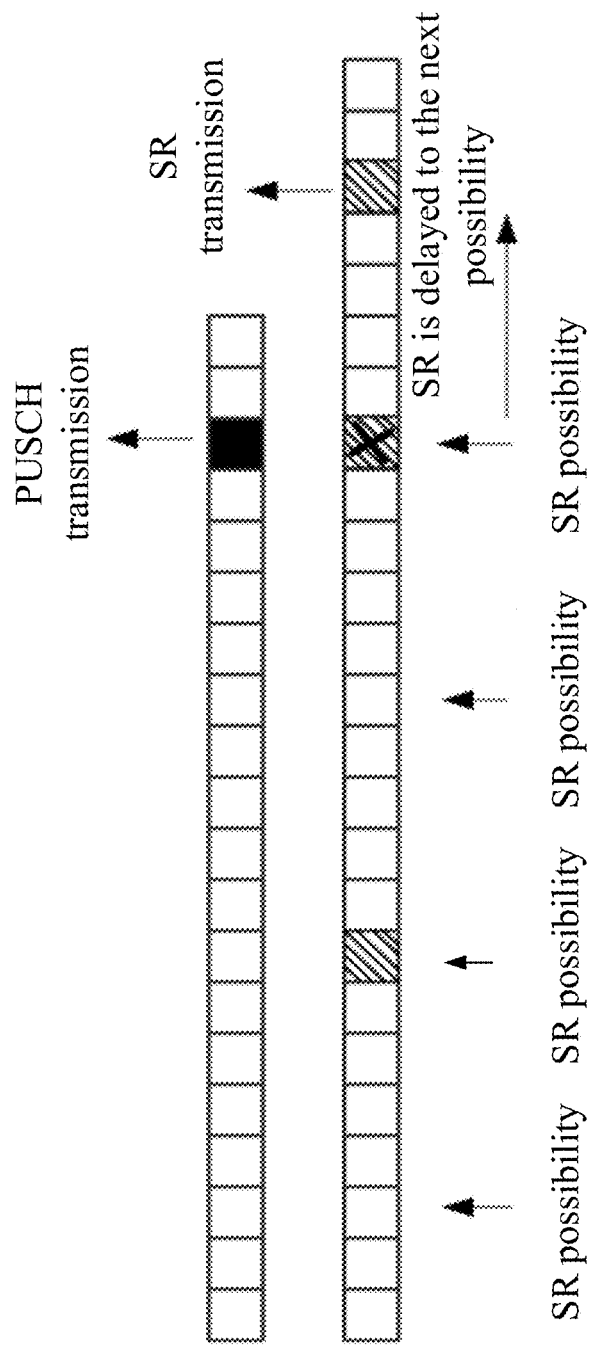
FIG. 2 is a schematic diagram of information transmission in a case that SR resources overlap UL-SCH transmission resources in the related art.
Figure 3:
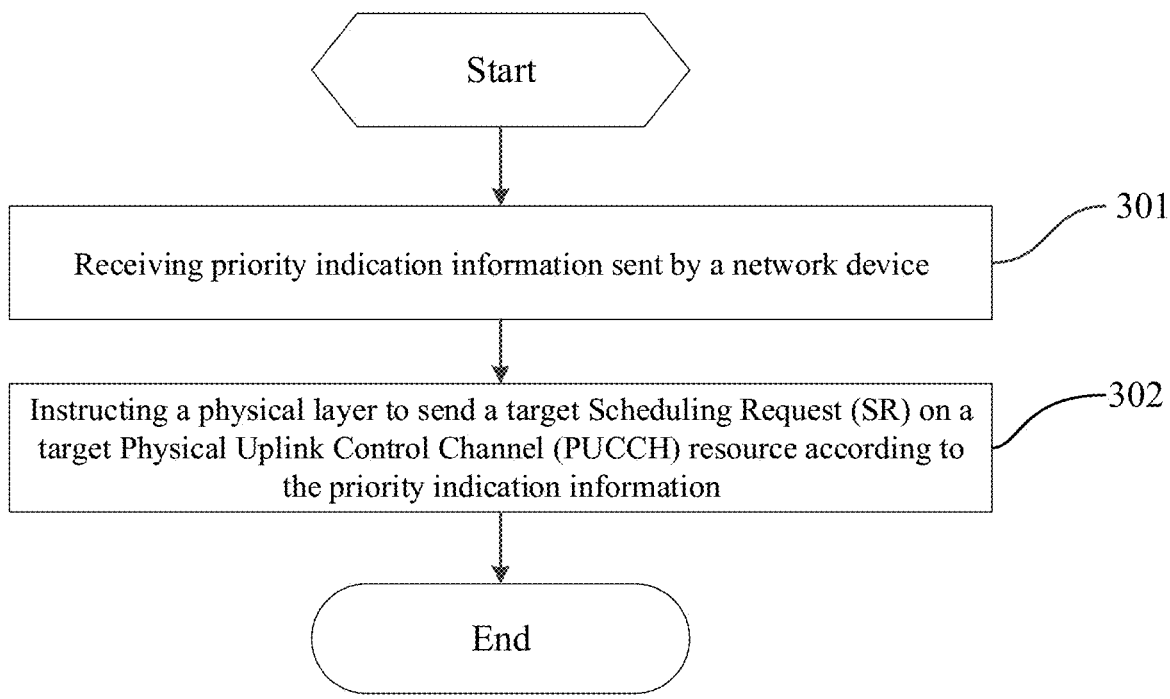
FIG. 3 is a flowchart of an information transmission method according to an embodiment of the present disclosure.

As shown in FIG. 3, a flow chart of an information transmission method provided by an embodiment of the disclosure, which is performed by a terminal, includes Steps 301-302.

Step 301: receiving priority indication information sent by a network device.

In this step, the priority indication information includes one of the following information: first information, wherein the first information is logical channel priority information; second information, for indicating a priority of a SR configuration; third information, for indicating relationship between a priority of a SR configuration and a priority of an UL-SCH transmission.

Step 302: according to the priority indication information, instructing a physical layer to send a target SR on a target physical uplink control channel (PUCCH) resource.

In an information transmission method of an embodiment of the present disclosure, by receiving priority indication information transmitted by a network device, instructing a physical layer, according to the priority indication information, to transmit a target SR on a target physical uplink control channel (PUCCH) resource, wherein the priority indication information includes one of the following information: first information which is logical channel priority information, second information for indicating a priority of a SR configuration, and third information for indicating a relationship between the priority of SR configuration and a priority of UL-SCH transmission, the SR can be transmitted in time, thereby avoiding a situation that a SR of some emergency services is delayed in transmission due to overlap of a SR resource with a UL-SCH transmission resource.

Based on the embodiment shown in FIG. 3, optionally, in an optional embodiment of the present disclosure, Step 301 may further include a following step: receiving the priority indication information sent through a radio resource control (RRC) signaling or a downlink control information (DCI) indication signaling or a medium access control (MAC) control element by the network device.

Optionally, the priority indication information includes the first information, and the first information is logical channel priority information.

Here, the logical channel priority information is used to indicate the relationship between a PUCCH resource for a SR configuration and a priority of UL-SCH transmission resource, in particular, used to indicate the relationship between priorities of one or more logical channels corresponding to the SR configuration and the priority of a logical channel for acquiring UL-SCH transmission data.

It should be noted that the logical channel for acquiring the UL-SCH transmission data specifically refers to a logical channel from which data comes or a logical channel for acquiring data, and the data is transmitted through the UL-SCH or a Physical Uplink Shared Channel (PUSCH).

Optionally, the priority indication information includes the second information, and the second information includes a priority control element. The priority control element includes a priority value for indicating whether the priority of SR configuration is high or low.

Optionally, the priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

Further, if the priority indication information is priority indication information sent by the network device through the RRC signaling, then optionally, the priority indication information includes, but is not limited to, one of the following information: logical channel priority information; a priority control element, the priority control element including a priority value for indicating whether the priority of SR configuration is high or low; indication information for indicating the relationship between the priority of SR configuration and the priority of UL-SCH transmission; a flag control element for identifying that the priority of SR configuration is higher than the priority of UL-SCH transmission.

If the priority indication information is priority indication information sent by the network device through the DCI indication signaling, then optionally, the priority indication information includes, but is not limited to, one of the following information: first flag information for indicating that the priority of SR configuration is higher than the priority of UL-SCH transmission; second flag information for indicating whether the priority of SR configuration is higher than the priority of UL-SCH transmission.

Optionally, in an optional embodiment of the present disclosure, Step 302 may further specifically include following steps: in a case that a second PUCCH resource in a SR configuration corresponding to a pending SR overlaps with an UL-SCH transmission resource, if a priority of a target object is determined to be lower than the priority of UL-SCH transmission according to the priority indication information, instructing the physical layer to transmit the SR on a next available third PUCCH resource adjacent to the second PUCCH resource.

In this step, the priority of the priority of the target object includes the priority of SR configuration, priorities of one or more logical channels corresponding to SR configuration, or a priority of a logical channel for triggering SR.

Here, a BSR triggers a SR so that the SR becomes a triggered SR or a pending SR, and a SR configuration corresponding to the logical channel triggering the BSR is a SR configuration corresponding to a triggered or pending SR, that is, the logical channel triggering the BSR is a logical channel triggering the SR.

Here, when it is determined that the priority of the target object is lower than the priority of UL-SCH transmission according to the priority indication information, instructing the physical layer to transmit the SR on a next available third PUCCH resource adjacent to the second PUCCH resource indicates that the pending SR has a non-emergency service, delaying transmission of the SR for a short time duration will not affect scheduling of a BSR at the network device.

It should be noted that the non-emergency service may be a service that does not have a high delay requirement.

Optionally, in an optional embodiment of the present disclosure, Step 302 may further specifically include the following step: in a case that a third PUCCH resource in a SR configuration corresponding to a pending SR overlaps with an UL-SCH transmission resource, if a priority of a target object is determined to be lower than the priority of UL-SCH transmission according to the priority indication information, instructing the terminal to transmit the UL-SCH on the UL-SCH transmission resource.

In this step, the priority of the target object includes a priority of SR configuration, priorities of one or more logical channels corresponding to SR configuration, or a priority of a logical channel for triggering a SR.

Here, a BSR triggers a SR so that the SR becomes a triggered SR or a pending SR, and a SR configuration corresponding to the logical channel triggering the BSR is a SR configuration corresponding to a triggered or pending SR, that is, the logical channel triggering the BSR is a logical channel triggering the SR.

Here, in a case that it is determined that the priority of the target object is lower than the priority of UL-SCH transmission according to the priority indication information, it shows that the priority of UL-SCH transmission is higher than the priority of SR configuration and thus the terminal is instructed to preferentially transmit the UL-SCH on the UL-SCH transmission resource.

Here, in order to avoid a situation where transmission of a SR for some emergency services is delayed due to overlap of a SR resource with the UL-SCH transmission resource, optionally, in an optional embodiment of the present disclosure, Step 302 may further include the following step: in a case that a first PUCCH resource in a SR configuration corresponding to a pending SR overlaps with an UL-SCH transmission resource, if a priority of a target object is determined to be higher than the priority of UL-SCH transmission according to the priority indication information, instructing the physical layer to transmit the SR on the first PUCCH resource.

Here, the emergency service may be a service having a high delay requirement, such as an URLLC (Ultra-Reliable and Low Latency Communications) service and the like.

In this step, the priority of the target object includes a priority of SR configuration, priorities of one or more logical channels corresponding to SR configuration, or a priority of a logical channel for triggering a SR.

Here, a BSR triggers a SR so that the SR becomes a triggered SR or a pending SR, and a SR configuration corresponding to the logical channel triggering the BSR is a SR configuration corresponding to a triggered or pending SR, that is, the logical channel triggering the BSR is a logical channel triggering the SR.

It should be noted that the pending SR can also be understood as the triggered SR.

Here, if the priority of the target object is determined to be higher than the priority of UL-SCH transmission according to the priority indication information, it shows that the pending SR is an emergency service, instructing a physical layer to transmit the SR on the first PUCCH resource when the priority of SR configuration is higher than the priority of UL-SCH transmission enables the pending SR can be transmitted in time, thereby effectively avoiding that scheduling of BSR by the network device is adversely delayed.

As an optional implementation, the priority indication information includes the first information, wherein the first information is logical channel priority information.

Here, the logical channel priority information is used to indicate the relationship between a PUCCH resource of a SR configuration and an UL-SCH transmission resource priority, in particular, is used to indicate a relationship between the priorities of one or more logical channels corresponding to the SR configuration and the priority of the logical channel for acquire UL-SCH transmission data.

It should be noted that the logical information in the logical channel for acquiring the UL-SCH transmission data specifically refers to the logical channel from which data comes or the logical channel for acquiring data, and the data is transmitted through the UL-SCH or the Physical Uplink Shared Channel (PUSCH).

Accordingly, if the priority of the target object is determined to be higher than the priority of UL-SCH transmission according to the priority indication information, instructing the physical layer to transmit the SR on the first PUCCH resource may further include the following step: if the priorities of one or more logical channels corresponding to the SR configuration corresponding to the pending SR is higher than the priority of the logical channel for acquiring UL-SCH transmission data, instructing the physical layer to send a SR on the first PUCCH resource.

A specific implementation process of the information transmission method of the present disclosure in a case that the priority indication information is logical channel priority information is specifically described below in connection with an example.

Step 1: sending, by a network device, SR configuration information and logical channel configuration information to a terminal through an RRC signaling, wherein the logical channel configuration information includes logical channel priority information.

Here, the SR configuration information includes following parameters: a SR resource; a SR cycle; an offset of SR transmission.

It should be noted that the logical channel priority information is further used to indicate a priority of logical channel multiplexing.

Step 2: receiving, by the terminal, the configuration information sent by the network device, and configuring a SR and a logical channel of the terminal according to the configuration information.

Step 3: in a case that at least one SR of the terminal is a pending SR, judging, by a MAC entity, each pending SR.

If a PUCCH resource in the SR configuration corresponding to the pending SR overlaps with the UL-SCH transmission resource, the UE compares the priorities of one or more logical channels corresponding to the SR configuration corresponding to the pending SR with a priority of a logical channel currently for acquiring the UL-SCH transmission data.

If the priorities of one or more logical channels corresponding to the SR configuration corresponding to the pending SR are higher than the priority of the logical channel currently for acquiring the UL-SCH transmission number, then the UE instructs the physical layer to send the SR on a PUCCH resource; otherwise the UE transmits the UL-SCH on the UL-SCH transmission resource.

It should be noted that the UE includes one or more MAC entities.

Here, functions implemented by a MAC entity may include scheduling, logical channel multiplexing, SR triggering, SR transmission, and the like.

Optionally, on basis of the above judgement conditions, other conditions need to further be determined, for example, PUCCH resources in the SR configuration of the pending SR exist, and measurement gaps do not overlap, etc., which are not limited herein.

As another optional implementation, the priority indication information includes a priority control element. The priority control element includes a priority value for indicating whether the priority of SR configuration is high or low, and accordingly, if the priority of the target object is determined to be higher than the priority of UL-SCH transmission according to the priority indication information, the instructing the physical layer to transmit the SR on the first PUCCH resource may further include the follow step: instructing the physical layer to transmit the SR on the first PUCCH resource if the priority of SR configuration represented by the priority value is higher than the priority of a logical channel for acquiring UL-SCH transmission data.

A specific implementation process of the information transmission method of the present disclosure under a condition that the priority indication information is a priority control element will be specifically described below in connection with an example.

Step 1: sending, by a network device, SR configuration information to a terminal through an RRC signaling, wherein the SR configuration information includes SR configuration parameters.

Here, the SR configuration parameters further include the following parameters: a SR resource, a SR cycle, and an offset of SR transmission.

It should be noted that the priority of SR configuration may rise as the priority value increases, for example, priority=0 represents the lowest priority.

Of course, the priority of SR configuration may also decrease as the priority value decreases, for example, priority=0 represents the highest priority. There is no specific limitation herein.

In addition, the priority of SR configuration may also be compared with the priority of logical channel multiplexing. If the priority value is lower than the priority of logical channel multiplexing, then it indicates that the priority of SR configuration is lower than the priority of UL-SCH transmission; otherwise, it indicates that the priority of SR configuration is higher than the priority of UL-SCH transmission.

Step 2: receiving, by the terminal, the SR configuration information sent by the network device, and configuring the SR of the terminal according to the SR configuration information.

Step 3: in a case that at least one SR of the terminal is a pending SR, judging, by the MAC entity, each pending SR.

If a PUCCH resource in the SR configuration corresponding to the pending SR overlaps a UL-SCH transmission resource and the priority of SR configuration is higher than the priority of UL-SCH transmission, the physical layer is instructed to send the SR on the PUCCH resource.

For example, in a case that the priority of a current SR configuration is 2, and the priority of a logical channel for acquiring UL-SCH transmission data is 1, it indicates that the priority of SR configuration is higher than the priority of a logical channel for acquiring UL-SCH transmission data, that is, it indicates that the priority of SR configuration of the pending SR is higher than the priority of UL-SCH transmission, the physical layer is instructed to transmit the SR on the PUCCH resource.

Optionally, on basis of the above judgement conditions, other conditions need to further be determined, for example, PUCCH resources in the SR configuration of the pending SR exist, and measurement gaps do not overlap, etc., which are not limited herein.

As yet another optional implementation, the priority indication information includes the third information. The third information includes indication information for indicating a relationship between the priority of SR configuration and the priority of UL-SCH transmission, and accordingly, if the priority of the target object is determined to be higher than the priority of UL-SCH transmission according to the priority indication information, then instructing the physical layer to transmit the SR on the first PUCCH resource may further include the follow step: if the indication information indicates that the priority of SR configuration is higher than the priority of UL-SCH transmission, instructing the physical layer to transmit the SR on the first PUCCH resource.

A specific implementation process of the information transmission method of the present disclosure is described below in connection with an example, when the priority indication information is indication information for indicating the relationship between the priority of SR configuration and the priority of UL-SCH transmission.

Step 1: transmitting, by a network device, SR configuration information to a terminal through an RRC signaling, wherein the SR configuration information includes SR configuration parameters, the SR configuration parameters include indication information for indicating a relationship between a priority of SR configuration and a priority of UL-SCH transmission.

Here, the SR configuration parameters further include the following parameters: a SR resource, a SR cycle, an offset of SR transmission.

Here, the indication information for indicating the relationship between the priority of SR configuration and the priority of UL-SCH transmission may be implemented in various forms. For example, a flag is defined. When flag=0, it indicates that the priority of the current SR configuration is lower than the priority of UL-SCH transmission, and when flag=1, it indicates that the priority of the current SR configuration is higher than the priority of UL-SCH transmission.

Step 2: receiving, by the terminal, the SR configuration information transmitted by the network device, and configures a SR of the terminal according to the SR configuration information.

Step 3: in a case that at least one SR of the terminal is a pending SR, judging, by a MAC entity, each pending SR.

If a PUCCH resource in the SR configuration corresponding to the pending SR overlaps with the UL-SCH transmission resource and the priority of SR configuration is higher than UL-SCH transmission, then the physical layer is instructed to transmit the SR on the PUCCH resource.

For example, if flag=1, then it indicates that the priority of SR configuration of a pending SR is higher than the priority of UL-SCH transmission, then the physical layer is instructed to send the SR on the PUCCH resource. If flag=0, then it indicates that the priority of SR configuration of a pending SR is lower than the priority of UL-SCH transmission, and the UE transmits the UL-SCH on the UL-SCH transmission resource.

Optionally, on basis of the above judgement conditions, other conditions need to further be determined, for example, PUCCH resources in the SR configuration of the pending SR exist, and measurement gaps do not overlap, etc., which are not limited herein.

As a further optional implementation, the priority indication information includes the third information. The third information includes a flag control element for identifying that the priority of SR configuration is higher than the priority of UL-SCH transmission; and accordingly, if the priority of the target object is determined to be higher than the priority of UL-SCH transmission according to the priority indication information, then instructing the physical layer to transmit the SR on the first PUCCH resource may further include the follow step: if it is determined that the flag control element exists, instructing a physical layer to transmit the SR on the first PUCCH resource.

In this step, the MAC entity determines whether the flag control element exists. Since the flag control element identifies that the priority of SR configuration is higher than the priority of UL-SCH transmission, it indicates that the priority of SR configuration is higher than the priority of UL-SCH transmission if the MAC entity determines that the flag control element exists, thereby further instructing the physical layer to send a SR on the first PUCCH resource.

A specific implementation process of the information transmission method of the present disclosure is described below in connection with an example, when the priority indication information is a flag control element for identifies that the priority of SR configuration is higher than the priority of UL-SCH transmission.

Step 1: sending, by a network device, SR configuration information to a terminal through an RRC signaling, wherein the SR configuration information includes SR configuration parameters, wherein, the SR configuration parameters include a flag control element for identifying that the priority of SR configuration is higher than the priority of UL-SCH transmission.

Here, the SR configuration parameters further include the following parameters: a SR resource, a SR cycle, and an offset of SR transmission.

Step 2: receiving, by the terminal, the SR configuration information sent by the network device, and configuring the SR of the terminal according to the SR configuration information.

Step 3: in a case that at least one SR of the terminal is a pending SR, judging, by the MAC entity, each pending SR.

If a PUCCH resource in the SR configuration corresponding to the pending SR overlaps a UL-SCH transmission resource and the priority of SR configuration is higher than the priority of UL-SCH transmission, the physical layer is instructed to send the SR on the PUCCH resource.

For example, the MAC entity of the UE determines whether the flag control element exists, and if the flag control element exists, it indicates that the priority of SR configuration of the pending SR is higher than the priority of UL-SCH transmission, the physical layer is instructed to transmit the SR on the PUCCH resource, and if the flag control element does not exist, it indicates that the priority of SR configuration of the pending SR is lower than the priority of UL-SCH transmission, the UE transmits the UL-SCH on a UL-SCH transmission resource.

Here, if the flag is set in the SR configuration, that is, if the flag control element is added to the SR configuration parameters, then the priority of the current SR configuration is higher than the priority of UL-SCH transmission.

If the flag is not set in the SR configuration, it indicates that the priority of the current SR configuration is lower than the priority of UL-SCH transmission.

Optionally, on basis of the above judgement conditions, other conditions need to further be determined, for example, PUCCH resources in the SR configuration of the pending SR exist, and measurement gaps do not overlap, etc., which are not limited herein.

Also, as one of the optional implementations, the priority indication information includes the third information. The third information includes first flag information for indicating that the priority of SR configuration is higher than the priority of UL-SCH transmission; and accordingly, if the priority of the target object is determined to be higher than the priority of UL-SCH transmission according to the priority indication information, then instructing the physical layer to transmit the SR on the first PUCCH resource may further include the follow step: if it is determined that the first flag information exists, instructing a physical layer to transmit the SR on the first PUCCH resource.

In addition, as one of the optional implementations, the priority indication information includes the third information. The third information includes second flag information for indicating whether the priority of SR configuration is higher than the priority of UL-SCH transmission; and accordingly, if the priority of the target object is determined to be higher than the priority of UL-SCH transmission according to the priority indication information, instructing the physical layer to transmit the SR on the first PUCCH resource may further include the follow step: if it is determined that the second flag information indicates that the priority of SR configuration is higher than the priority of UL-SCH transmission, instructing the physical layer to transmit the SR on the first PUCCH resource.

A specific implementation process of the information transmission method of the present disclosure when the priority indication information is the first flag information or the second flag information will be described below in connection with an example.

Step 1: sending, by a network device, SR configuration information to a terminal through a DCI indication signaling, wherein the SR configuration information includes first flag information or second flag information.

The SR configuration information also includes SR configuration parameters. Here, the SR configuration parameters include the following parameters: a SR resource, a SR cycle, an offset of SR transmission.

Step 2: receiving, by a terminal, the SR configuration information sent by the network device, and configuring the SR of the terminal according to the SR configuration information.

Step 3: in a case that at least one SR of the terminal is a pending SR, judging, by the MAC entity, each pending SR.

If the PUCCH resource in the SR configuration corresponding to the pending SR overlaps with the UL-SCH transmission resource, the MAC entity of the UE judges the DCI indication signaling for scheduling the current UL-SCH transmission.

In one case, it may be determined whether the first flag information is included in the DCI indication signaling. If the first flag information is included in the DCI indication signaling, it indicates that the priority of SR configuration is higher than the priority of UL-SCH transmission, and the physical layer is instructed to transmit the SR on the PUCCH resource, and if the first flag information is not included in the DCI indication signaling, the UE transmits the UL-SCH on the UL-SCH transmission resource.

In another case, it may be determined whether a flag of the second flag information in the DCI indication signaling is 1. If the flag is 1, it indicates that the priority of SR configuration is higher than the priority of UL-SCH transmission, and the physical layer is instructed to transmit the SR on the PUCCH resource, and if the flag is 0, it indicates that the priority of SR configuration is lower than the priority of UL-SCH transmission, and the UE transmits the UL-SCH on the UL-SCH transmission resource.

Optionally, on basis of the above judgement conditions, other conditions need to further be determined, for example, PUCCH resources in the SR configuration of the pending SR exist, and measurement gaps do not overlap, etc., which are not limited herein.

It should be noted that, in the above embodiment of the present disclosure, an entity for performing the information transmission method may be a terminal or a MAC entity.

The information transmission method of the embodiment of the present disclosure receives priority indication information transmitted by a network device, and instructs, according to the priority indication information, a physical layer to transmit a target SR on a target Physical Uplink Control Channel (PUCCH) resource, wherein the priority indication information includes one of following information: first information, the first information being logical channel priority information; second information, the second information being used for indicating a priority of SR configuration; third information, the third information being used for indicating relationship between the priority of SR configuration and the priority of UL-SCH transmission, so that the SR can be transmitted in time and it may be avoided that the SR resource and the UL-SCH transmission resource overlap and in turn transmission of the SR of some emergency services is delayed.

Figure 4:
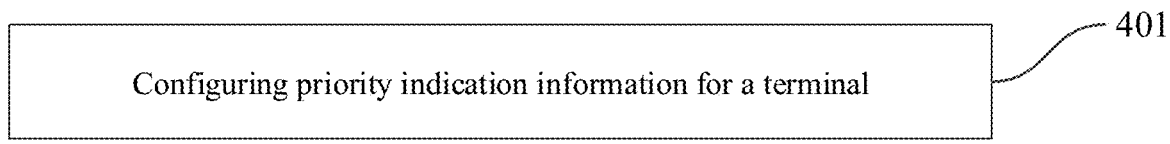
FIG. 4 is a flowchart of an information configuration method according to an embodiment of the present disclosure.

As shown in FIG. 4, a flow chart of an information configuration method provided by an embodiment of the present disclosure is shown. The information configuration method is performed by a network device. The method includes Step 401.

Step 401: configuring priority indication information for a terminal.

In this step, the priority indication information includes one of the following information: first information, the first information being logical channel priority information; second information, for indicating a priority of a SR configuration; third information, for indicating relationship between a priority of SR configuration and a priority of UL-SCH transmission.

The information configuration method in the embodiment of the present disclosure configures priority indication information for a terminal, wherein the priority indication information includes one of the following information: first information which is logical channel priority information, second information for indicating a priority of SR configuration, and third information for indicating a relationship between the priority of SR configuration and a priority of UL-SCH transmission. In this way, after the terminal receives the priority indication information configured by the network device, the terminal may instruct, according to the priority indication information, the physical layer to send a target SR on a target Physical Uplink Control Channel (PUCCH) resource, and the SR can be transmitted in time, thereby avoiding a situation that a SR of some emergency services is delayed in transmission due to overlap of a SR resource with a UL-SCH transmission resource.

Optionally, the priority indication information includes the first information, and the first information is logical channel priority information.

Here, the logical channel priority information is used to indicate the relationship between a PUCCH resource for a SR configuration and a priority of UL-SCH transmission resource, in particular, used to indicate the relationship between priorities of one or more logical channels corresponding to the SR configuration and the priority of a logical channel for acquiring UL-SCH transmission data.

It should be noted that the logical channel for acquiring the UL-SCH transmission data specifically refers to a logical channel from which data comes or a logical channel for acquiring data, and the data is transmitted through the UL-SCH or a Physical Uplink Shared Channel (PUSCH).

Optionally, the priority indication information includes the second information, and the second information includes a priority control element. The priority control element includes a priority value for indicating whether the priority of SR configuration is high or low.

Optionally, the priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

In an optional embodiment of the present disclosure, after step 401, the method may further include the following step: sending the priority indication information to the terminal.

Optionally, this step may further specifically include the following: sending the priority indication information to the terminal through an RRC signaling or a DCI indication signaling or a MAC control element.

It should be noted that, if the priority indication information is sent to the terminal through the RRC signaling, then optionally, the priority indication information includes, but is not limited to, one of the following information: logical channel priority information; a priority control element, the priority control element including a priority value for indicating whether the priority of SR configuration is high or low; indication information for indicating the relationship between the priority of SR configuration and the priority of UL-SCH transmission; a flag control element for identifying that the priority of SR configuration is higher than the priority of UL-SCH transmission.

If the priority indication information is sent to the terminal through the DCI indication signaling, then optionally, the priority indication information includes, but is not limited to, one of the following information: first flag information for indicating that the priority of SR configuration is higher than the priority of UL-SCH transmission; second flag information for indicating whether the priority of SR configuration is higher than the priority of UL-SCH transmission.

The information configuration method in the embodiment of the present disclosure configures priority indication information for a terminal, wherein the priority indication information includes one of the following information: first information which is logical channel priority information, second information for indicating a priority of SR configuration, and third information for indicating a relationship between the priority of SR configuration and a priority of UL-SCH transmission. In this way, after the terminal receives the priority indication information configured by the network device, the terminal may instruct, according to the priority indication information, the physical layer to send a target SR on a target Physical Uplink Control Channel (PUCCH) resource, and the SR can be transmitted in time, thereby avoiding a situation that a SR of some emergency services is delayed in transmission due to overlap of a SR resource with a UL-SCH transmission resource.

Figure 5:
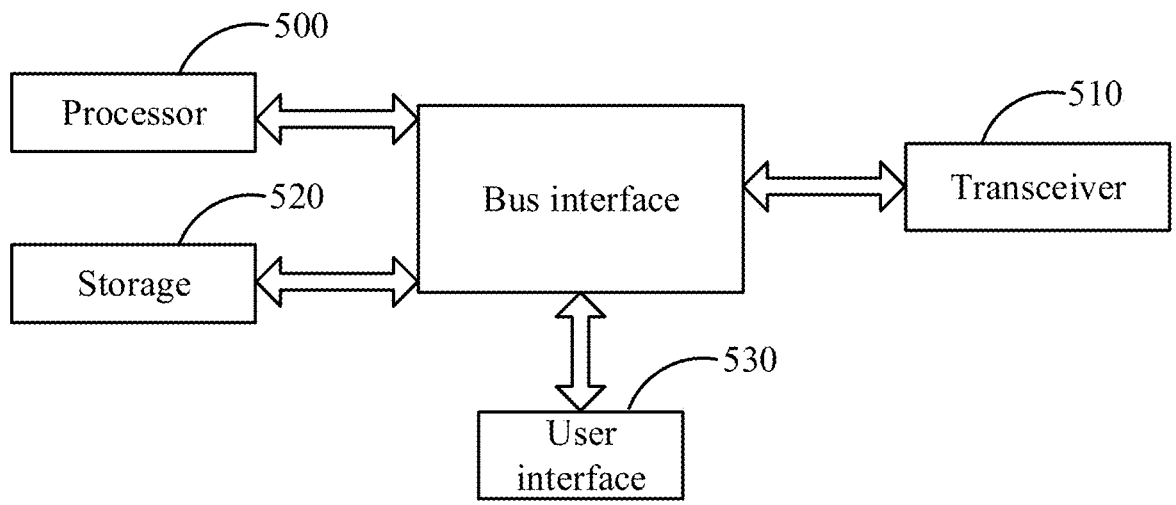
FIG. 5 is a structural block diagram of a terminal according to an embodiment of the present disclosure.

As shown in FIG. 5, an embodiment of the present disclosure also provides a terminal. The terminal includes a storage 520, a processor 500, a transceiver 510, a bus interface and a program stored on the storage 520 and executable by the processor 500. The transceiver 510 is configured to receive priority indication information sent by the network device, and the processor 500 is configured to read the program in the storage 520 and execute the following step: according to the priority indication information, instructing a physical layer to send a target SR on a target physical uplink control channel (PUCCH) resource.

The priority indication information includes one of the following information: first information, wherein the first information is logical channel priority information; second information for indicating a priority of SR configuration; third information for indicating relationship between a priority of SR configuration and a priority of UL-SCH transmission.

In FIG. 5, a bus architecture may include any number of interconnected buses and bridges. Specifically, various circuits such as one or more processors represented by the processor 500 and a storage represented by the storage 520 are linked together. The bus architecture may also link together various other circuits, such as peripherals, voltage regulators, and power management circuits, all of which are well known in the art and thus will not be described further herein. A bus interface provides an interface. The transceiver 510 may be a plurality of elements, i.e., including a transmitter and a transceiver, for providing means for communicating with various other devices over a transmission medium. For different user devices, a user interface 530 may also be an interface capable of externally interfacing with a desired device which includes, but is not limited to, a keypad, display, speaker, microphone, joystick, and the like.

The processor 500 is responsible for managing the bus architecture and general processing, and the storage 520 may store data used by the processor 500 in performing operations.

Optionally, the processor 500 is further configured to: in a case that a first PUCCH resource in a SR configuration corresponding to a pending SR overlaps with an UL-SCH transmission resource, if a priority of a target object is determined to be higher than the priority of UL-SCH transmission according to the priority indication information, instruct the physical layer to transmit the SR on the first PUCCH resource.

Optionally, the processor 500 is further configured to: in a case that a second PUCCH resource in a SR configuration corresponding to a pending SR overlaps with an UL-SCH transmission resource, if a priority of a target object is determined to be lower than the priority of UL-SCH transmission according to the priority indication information, instruct the physical layer to transmit the SR on a next available third PUCCH resource adjacent to the second PUCCH resource.

Optionally, the processor 500 is further configured to: in a case that a third PUCCH resource in a SR configuration corresponding to a pending SR overlaps with an UL-SCH transmission resource, if a priority of a target object is determined to be lower than the priority of UL-SCH transmission according to the priority indication information, instruct the terminal to transmit the UL-SCH on the UL-SCH transmission resource.

Optionally, the priority of the target object includes a priority of SR configuration, priorities of one or more logical channels corresponding to SR configuration, or a priority of a logical channel for triggering a SR.

Here, a BSR triggers a SR so that the SR becomes a triggered SR or a pending SR, and a SR configuration corresponding to the logical channel triggering the BSR is a SR configuration corresponding to a triggered or pending SR, that is, the logical channel triggering the BSR is a logical channel triggering the SR.

Optionally, the transceiver 510 is further configured to: receive the priority indication information sent through a radio resource control (RRC) signaling or a downlink control information (DCI) indication signaling or a medium access control (MAC) control element by the network device.

Optionally, the priority indication information includes the second information, and the second information includes a priority control element. The priority control element includes a priority value for indicating whether the priority of SR configuration is high or low.

Optionally, the priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

Optionally, the priority indication information includes the first information, and the first information is logical channel priority information. The processor 500 is further configured to: instruct the physical layer to transmit the SR on the first PUCCH resource if the priorities of one or more logical channels corresponding to SR configuration of a pending SR is higher than the priority of a logical channel for acquiring UL-SCH transmission data.

Optionally, the priority indication information includes the second information, and the second information includes a priority control element. The priority control element includes a priority value for indicating whether the priority of SR configuration is high or low.

The processor 500 is further configured to: instruct the physical layer to transmit the SR on the first PUCCH resource if the priority of SR configuration represented by the priority value is higher than the priority of a logical channel for acquiring UL-SCH transmission data.

Optionally, the priority indication information includes the third information. The third information includes indication information for indicating the relationship between the priority of SR configuration and the priority of UL-SCH transmission, and the processor 500 is further configured to: instruct the physical layer to transmit the SR on the first PUCCH resource, if the indication information indicates that the priority of SR configuration is higher than the priority of UL-SCH transmission.

Optionally, the third information includes a flag control element for identifying that the priority of SR configuration is higher than the priority of UL-SCH transmission. The processor 500 is further configured to: instruct a physical layer to transmit the SR on the first PUCCH resource, if it is determined that the flag control element exists.

Optionally, the priority indication information includes the third information. The third information includes first flag information for indicating that the priority of SR configuration is higher than the priority of UL-SCH transmission. The processor 500 is further configured to: instruct a physical layer to transmit the SR on the first PUCCH resource if it is determined that the first flag information exists.

Optionally, the priority indication information includes the third information. The third information includes second flag information for indicating whether the priority of SR configuration is higher than the priority of UL-SCH transmission. The processor 500 is further configured to: instruct the physical layer to transmit the SR on the first PUCCH resource if it is determined that the second flag information indicates that the priority of SR configuration is higher than the priority of UL-SCH transmission.

Figure 6:
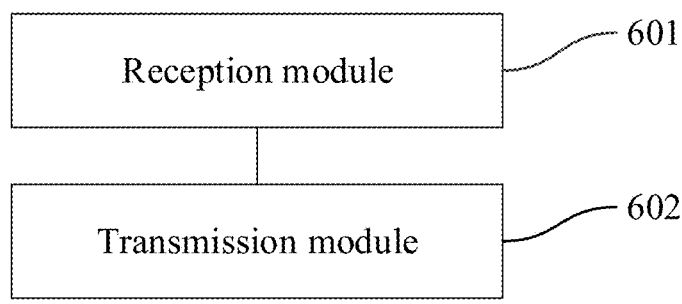
FIG. 6 is a block diagram of modules of a terminal according to an embodiment of the present disclosure.

As shown in FIG. 6, an embodiment of the present disclosure also provides a terminal. The terminal includes: a reception module 601 configured to receive priority indication information sent by a network device; and a transmission module 602 configured to, according to the priority indication information, instruct a physical layer to transmit a target SR on a target physical uplink control channel (PUCCH) resource.

The priority indication information includes one of the following information: first information, wherein the first information is logical channel priority information; second information for indicating a priority of SR configuration; third information for indicating relationship between a priority of SR configuration and a priority of UL-SCH transmission.

In the terminal of this embodiment, the transmission module 602 includes: a first transmission unit configured to, in a case that a first PUCCH resource in a SR configuration corresponding to a pending SR overlaps with an UL-SCH transmission resource, if a priority of a target object is determined to be higher than the priority of UL-SCH transmission according to the priority indication information, instruct the physical layer to transmit the SR on the first PUCCH resource.

In the terminal of this embodiment, the transmission module 602 includes: a second transmission unit configured to, in a case that a second PUCCH resource in a SR configuration corresponding to a pending SR overlaps with an UL-SCH transmission resource, if a priority of a target object is determined to be lower than the priority of UL-SCH transmission according to the priority indication information, instruct the physical layer to transmit the SR on a next available third PUCCH resource adjacent to the second PUCCH resource.

In the terminal of this embodiment, the transmission module 602 includes: a third transmission unit configured to, in a case that a third PUCCH resource in a SR configuration corresponding to a pending SR overlaps with an UL-SCH transmission resource, if a priority of a target object is determined to be lower than the priority of UL-SCH transmission according to the priority indication information, instruct the terminal to transmit the UL-SCH on the UL-SCH transmission resource.

Optionally, the priority of the target object includes a priority of SR configuration, priorities of one or more logical channels corresponding to SR configuration, or a priority of a logical channel for triggering a SR.

Here, a BSR triggers a SR so that the SR becomes a triggered SR or a pending SR, and a SR configuration corresponding to the logical channel triggering the BSR is a SR configuration corresponding to a triggered or pending SR, that is, the logical channel triggering the BSR is a logical channel triggering the SR.

In the terminal of this embodiment, the reception module 601 includes: a first reception unit configured to receive the priority indication information sent through a radio resource control (RRC) signaling or a downlink control information (DCI) indication signaling or a medium access control (MAC) control element by the network device.

Optionally, the priority indication information includes the second information, and the second information includes a priority control element. The priority control element includes a priority value for indicating whether the priority of SR configuration is high or low.

Optionally, the priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

Optionally, the priority indication information includes the first information, and the first information is logical channel priority information. In the terminal of the embodiment, the first transmission unit is specifically configured to instruct the physical layer to transmit the SR on the first PUCCH resource if the priorities of one or more logical channels corresponding to SR configuration of a pending SR are higher than the priority of a logical channel for acquiring UL-SCH transmission data.

Optionally, the priority indication information includes the second information, and the second information includes a priority control element. The priority control element includes a priority value for indicating whether the priority of SR configuration is high or low. In the terminal of the embodiment, the first transmission unit is specifically configured to instruct the physical layer to transmit the SR on the first PUCCH resource if the priority of SR configuration represented by the priority value is higher than the priority of a logical channel for acquiring UL-SCH transmission data.

Optionally, the priority indication information includes the third information. The third information includes indication information for indicating the relationship between the priority of SR configuration and the priority of UL-SCH transmission. In the terminal of the embodiment, the first transmission unit is specifically configured to instruct the physical layer to transmit the SR on the first PUCCH resource if the indication information indicates that the priority of SR configuration is higher than the priority of UL-SCH transmission.

Optionally, the priority indication information includes the third information. The third information includes a flag control element for identifying that the priority of SR configuration is higher than the priority of UL-SCH transmission. In the terminal of the embodiment, the first transmission unit is specifically configured to instruct a physical layer to transmit the SR on the first PUCCH resource, if it is determined that the flag control element exists.

Optionally, the priority indication information includes the third information. The third information includes first flag information for indicating that the priority of SR configuration is higher than the priority of UL-SCH transmission. In the terminal of the embodiment, the first transmission unit is specifically configured to instruct a physical layer to transmit the SR on the first PUCCH resource if it is determined that the first flag information exists.

Optionally, the priority indication information includes the third information. The third information includes second flag information for indicating whether the priority of SR configuration is higher than the priority of UL-SCH transmission. In the terminal of the embodiment, the first transmission unit is specifically configured to instruct the physical layer to transmit the SR on the first PUCCH resource if it is determined that the second flag information indicates that the priority of SR configuration is higher than the priority of UL-SCH transmission.

In the terminal of the embodiment of the present disclosure, the reception module receives priority indication information transmitted by a network device, the transmission module instructs a physical layer, according to the priority indication information, to transmit a target SR on a target physical uplink control channel (PUCCH) resource, wherein the priority indication information includes one of the following information: first information which is logical channel priority information, second information for indicating a priority of a SR configuration, and third information for indicating a relationship between the priority of SR configuration and a priority of UL-SCH transmission, the SR can be transmitted in time, thereby avoiding a situation that a SR of some emergency services is delayed in transmission due to overlap of a SR resource with a UL-SCH transmission resource.

In some embodiments of the present disclosure, a computer readable storage medium is provided. The computer readable storage medium has stored thereon a computer program that, when executed by a processor, implements the steps of: receiving priority indication information transmitted by a network device; according to the priority indication information, instructing a physical layer to send a target SR on a target physical uplink control channel (PUCCH) resource.

The priority indication information includes one of the following information: first information, wherein the first information is logical channel priority information; second information for indicating a priority of SR configuration; third information for indicating relationship between a priority of SR configuration and a priority of UL-SCH transmission.

When the program is executed by the processor, all the implementations applied to the method embodiment at the terminal side as shown in FIG. 3 can be implemented, and in order to avoid repetition, detailed description thereof is omitted here.

Figure 7:
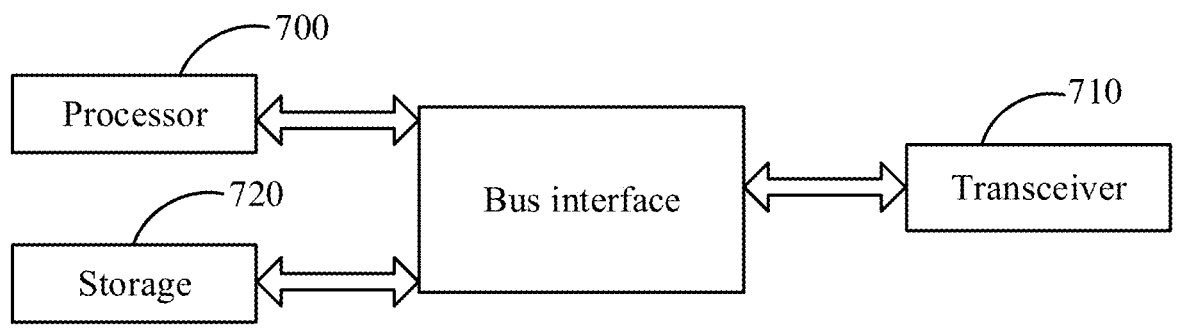
FIG. 7 is a structural block diagram of a network device according to an embodiment of the present disclosure.

As shown in FIG. 7, an embodiment of the present disclosure also provides a network device. The network device includes a transceiver 710, a storage 720, a processor 700, and a program stored on the storage and executable by the processor. The processor 700 is configured to read the program in the storage 720 and perform the following step: configuring priority indication information for a terminal.

The priority indication information includes one of the following information: first information, the first information being logical channel priority information; second information, for indicating a priority of SR configuration; third information, for indicating relationship between a priority of SR configuration and a priority of UL-SCH transmission.

In FIG. 7, a bus architecture may include any number of interconnected buses and bridges. Specifically, various circuits such as one or more processors represented by the processor 700 and a storage represented by the storage 720 are linked together. The bus architecture may also link together various other circuits, such as peripherals, voltage regulators, and power management circuits, all of which are well known in the art and thus will not be described further herein. A bus interface provides an interface. The transceiver 710 may be a plurality of elements, i.e., including a transmitter and a transceiver, for providing means for communicating with various other devices over a transmission medium. The processor 700 is responsible for managing the bus architecture and general processing, and the storage 720 may store date used during operation of the processor 700.

Optionally, the priority indication information includes the second information, and the second information includes a priority control element. The priority control element includes a priority value for indicating whether the priority of SR configuration is high or low.

Optionally, the priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

Optionally, the transceiver 710 is configured to send the priority indication information to the terminal.

Optionally, the transceiver 710 is further configured to send the priority indication information to the terminal through an RRC signaling or a DCI indication signaling or a MAC control element.

Figure 8:
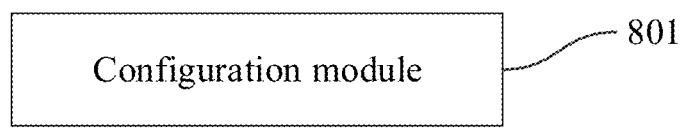
FIG. 8 is a block diagram of modules of a network device according to an embodiment of the present disclosure.

As shown in FIG. 8, the embodiment of the present disclosure also provides a network device. The network device includes a configuration module 801 configured to configure priority indication information for a terminal;

The priority indication information includes one of the following information: first information, the first information being logical channel priority information; second information, for indicating a priority of SR configuration; third information, for indicating relationship between a priority of SR configuration and a priority of UL-SCH transmission.

Optionally, the priority indication information includes the second information, and the second information includes a priority control element. The priority control element includes a priority value for indicating whether the priority of SR configuration is high or low.

Optionally, the priority indication information includes the third information, and the third information includes one of the following information: indication information for indicating the relationship between the priority of SR configuration and the priority of UL-SCH transmission; a flag control element for identifying that the priority of SR configuration is higher than the priority of UL-SCH transmission; first flag information for indicating that the priority of SR configuration is higher than the priority of UL-SCH transmission; second flag information for indicating whether the priority of SR configuration is higher than the priority of UL-SCH transmission.

The network device of the embodiment of the present disclosure further includes a sending module configured to send the priority indication information to the terminal.

In the network device of the embodiment of the present disclosure, the sending module includes a sending unit configured to send the priority indication information to the terminal through an RRC signaling or a DCI indication signaling or a MAC control element.

In the network device according to the embodiment of the present disclosure, the configuration module configures priority indication information for a terminal, wherein the priority indication information includes one of the following information: first information which is logical channel priority information, second information for indicating a priority of SR configuration, and third information for indicating a relationship between the priority of SR configuration and a priority of UL-SCH transmission. In this way, after the terminal receives the priority indication information configured by the network device, the terminal may instruct, according to the priority indication information, the physical layer to send a target SR on a target Physical Uplink Control Channel (PUCCH) resource, and the SR can be transmitted in time, thereby avoiding a situation that a SR of some emergency services is delayed in transmission due to overlap of a SR resource with a UL-SCH transmission resource.

In some embodiments of the present disclosure, a computer readable storage medium is further provided. The computer readable storage medium has stored thereon a computer program that, when executed by a processor, implements the step of: configuring priority indication information for a terminal.

The priority indication information includes one of the following information: first information, the first information being logical channel priority information; second information, for indicating a priority of a SR configuration; third information, for indicating relationship between a priority of SR configuration and a priority of UL-SCH transmission.

When the program is executed by the processor, all of the above-mentioned implementations of the method embodiment performed by the network device shown in FIG. 4 can be implemented, and in order to avoid repetition, detailed description is omitted here.

It will be appreciated that the embodiments described in the embodiments of the present disclosure may be implemented in hardware, software, firmware, middleware, microcode, or combinations thereof. For implementation by hardware, a processing unit may be implemented in one or more of following: an Application Specific Integrated Circuit (ASIC), a Digital Signal Processor (DSP), a Digital Signal Processing Device (DSPD), a Programmable Logic Device (PLD), a Field-Programmable Gate Array (FPGA), a general purpose processor, a controller, a microcontroller, a microprocessor, other electronic units for performing the functions described in the present disclosure, or a combination thereof.

For implementation by software, techniques described in embodiments of the present disclosure may be implemented by modules (e.g., processes, functions, etc.) that perform the functions described in embodiments of the present disclosure. A software code may be stored in a storage and executed by a processor. The storage may be implemented in the processor or external to the processor.

In addition, each functional unit in each embodiment of the present disclosure may be integrated in one processing unit, each unit may be separately physically provided, or two or more units may be integrated as one unit.

The functions may be stored in a computer readable storage medium if the functions are implemented in a form of software functional units and sold or used as stand-alone products. Based on such understanding, an essential part, a part contributing to the prior art, or a part of the technical solutions of the present disclosure may be embodied in a form of a software product. The computer software product is stored in a storage medium and includes instructions for causing a computer device (which may be a personal computer, a server, a network device or the like) performs all or part of the steps of the methods described in various embodiments of the present disclosure. The storage medium includes various media capable of storing program codes, such as a USB disk, a portable hard disk, a Read-Only Memory (ROM), a Random Access Memory (RAM), a magnetic disk or an optical disk.

In various embodiments of the present disclosure, it should be understood that values of sequence numbers of the above-described processes do not imply an order of execution, the order of execution of the processes should be determined by their functions and inherent logic, and should not be construed as any limitation on the implementation processes of the embodiments of the present disclosure.

The foregoing are optional embodiments of the present disclosure, and it should be noted that several modifications and embellishments may be made by those of ordinary skill in the art without departing from the principles set forth in the present disclosure. These modifications and embellishments should also be considered as being within the protection scope of the present disclosure.

What is claimed is:

1. An information transmission method performed by a terminal, comprising:
   receiving priority indication information sent through a Radio Resource Control (RRC) signaling or a Downlink Control Information (DCI) indication signaling or a Medium Access Control (MAC) control element by a network device;
   instructing a physical layer to send a target Scheduling Request (SR) on a target Physical Uplink Control Channel (PUCCH) resource according to the priority indication information;
   wherein the priority indication information comprises first information and second information,
   the first information is logical channel priority information, the logical channel priority information is configured for indicating a priority of logical channel multiplexing, the second information is configured for indicating a priority of SR configuration, the priority of SR configuration is determined to be lower than a priority of Uplink Scheduling Channel (UL-SCH) transmission by comparing a priority of logical channel multiplexing with the priority of SR configuration;
   wherein, instructing the physical layer to send the target SR on the target PUCCH resource according to the priority indication information comprises:
      in a case that a first PUCCH resource in SR configuration corresponding to a pending SR overlaps with an UL-SCH transmission resource, instructing the physical layer to transmit the SR on the first PUCCH resource, if a priority of a target object is determined to be higher than the priority of UL-SCH transmission according to the priority indication information; or
      in a case that a second PUCCH resource in SR configuration corresponding to a pending SR overlaps with an UL-SCH transmission resource, instructing the physical layer to transmit the SR on a next available third PUCCH resource adjacent to the second PUCCH resource, if the priority of SR configuration is determined to be lower than the priority of UL-SCH transmission according to the priority indication information; or
      in a case that a third PUCCH resource in SR configuration corresponding to a pending SR overlaps with an UL-SCH transmission resource, instructing the terminal to transmit the UL-SCH on the UL-SCH transmission resource, if the priority of SR configuration is determined to be lower than the priority of UL-SCH transmission according to the priority indication information.

2. The information transmission method according to claim 1, wherein, in a case that the first PUCCH resource in the SR configuration corresponding to the pending SR overlaps with the UL-SCH transmission resource, the priority of the target object comprises the priority of SR configuration, priorities of one or more logical channels corresponding to SR configuration, or a priority of a logical channel for triggering a SR.

3. The information transmission method according to claim 1, wherein the second information comprises a priority control element, the priority control element comprises a priority value for indicating whether the priority of SR configuration is high or low.

4. The information transmission method according to claim 1, wherein, in a case that the first PUCCH resource in the SR configuration corresponding to the pending SR overlaps with the UL-SCH transmission resource, instructing the physical layer to transmit the SR on the first PUCCH resource if the priority of the target object is determined to be higher than the priority of UL-SCH transmission according to the priority indication information comprises:
   instructing the physical layer to transmit the SR on the first PUCCH resource if priorities of one or more logical channels corresponding to SR configuration of a pending SR are higher than the priority of a logical channel for acquiring UL-SCH transmission data.

5. An information configuration method performed by a network device, comprising:
   configuring priority indication information for a terminal; and
   sending the priority indication information to the terminal through a Radio Resource Control (RRC) signaling or a Downlink Control Information (DCI) indication signaling or a Medium Access Control (MAC) control element,
wherein the priority indication information comprises first information and second information,
the first information is logical channel priority information, the logical channel priority information is configured for indicating a priority of logical channel multiplexing, the second information is configured for indicating a priority of SR configuration; the priority of SR configuration is determined to be lower than a priority of Uplink Scheduling Channel (UL-SCH) transmission by comparing a priority of logical channel multiplexing with the priority SR configuration;
wherein,
in a case that a first PUCCH resource in SR configuration corresponding to a pending SR overlaps with an UL-SCH transmission resource and if a priority of a target object is determined by the terminal to be higher than the priority of UL-SCH transmission according to the priority indication information, the SR is transmitted by the terminal on the first PUCCH resource; or
in a case that a second PUCCH resource in SR configuration corresponding to a pending SR overlaps with an UL-SCH transmission resource and if the priority of the SR configuration is determined by the terminal to be lower than the priority of UL-SCH transmission according to the priority indication information, the SR is transmitted by the terminal on a next available third PUCCH resource adjacent to the second PUCCH resource; or
in a case that a third PUCCH resource in SR configuration corresponding to a pending SR overlaps with an UL-SCH transmission resource and if the priority of SR configuration is determined by the terminal to be lower than the priority of UL-SCH transmission according to the priority indication information, the UL-SCH is transmitted by the terminal on the UL-SCH transmission resource.

6. The information configuration method according to claim 5, wherein the second information comprises a priority control element, the priority control element comprises a priority value for indicating whether the priority of SR configuration is high or low.

7. A terminal, comprising:
a transceiver, a storage, a processor and a program stored on the storage and executable by the processor, wherein,
the transceiver is configured to receive priority indication information sent through a Radio Resource Control (RRC) signaling or a Downlink Control Information (DCI) indication signaling or a Medium Access Control (MAC) control element by a network device;
the processor is configured to read the program in the storage and perform the following step of instructing a physical layer to send a target Scheduling Request (SR) on a target Physical Uplink Control Channel (PUCCH) resource according to the priority indication information;
the priority indication information comprises first information and second information,
the first information is logical channel priority information, the logical channel priority information is configured for indicating a priority of logical channel multiplexing, the second information is configured for indicating a priority of SR configuration, the priority of SR configuration is determined to be lower than a priority of Uplink Scheduling Channel (UL-SCH) transmission by comparing a priority of logical channel multiplexing with the priority of SR configuration;
the processor is further configured to:
in a case that a first PUCCH resource in SR configuration corresponding to a pending SR overlaps with an UL-SCH transmission resource, instruct the physical layer to transmit the SR on the first PUCCH resource, if a priority of a target object is determined to be higher than the priority of UL-SCH transmission according to the priority indication information; or
in a case that a second PUCCH resource in SR configuration corresponding to a pending SR overlaps with an UL-SCH transmission resource, instruct the physical layer to transmit the SR on a next available third PUCCH resource adjacent to the second PUCCH resource, if the priority of SR configuration is determined to be lower than the priority of UL-SCH transmission according to the priority indication information; or
in a case that a third PUCCH resource in SR configuration corresponding to a pending SR overlaps with an UL-SCH transmission resource, instruct the terminal to transmit the UL-SCH on the UL-SCH transmission resource, if the priority of SR configuration is determined to be lower than the priority of UL-SCH transmission according to the priority indication information.

8. The terminal according to claim 7, wherein, in a case that the first PUCCH resource in the SR configuration corresponding to the pending SR overlaps with the UL-SCH transmission resource, the priority of the target object comprises the priority of SR configuration, priorities of one or more logical channels corresponding to SR configuration, or a priority of a logical channel for triggering a SR.

9. The terminal according to claim 7, wherein the second information comprises a priority control element, the priority control element comprises a priority value for indicating whether the priority of SR configuration is high or low.

10. The terminal according to claim 7, wherein, in a case that the first PUCCH resource in the SR configuration corresponding to the pending SR overlaps with the UL-SCH transmission resource, the processor is further configured to instruct the physical layer to transmit the SR on the first PUCCH resource if priorities of one or more logical channels corresponding to SR configuration of a pending SR are higher than the priority of a logical channel for acquiring UL-SCH transmission data.

11. A network device, comprising:
a transceiver, a storage, a processor and a program stored in the storage and executable by the processor, wherein the processor is configured to read the program in the storage to perform steps of the information configuration method according to claim 5.

12. The network device according to claim 11, wherein the second information comprises a priority control element, the priority control element comprises a priority value for indicating whether the priority of SR configuration is high or low.

* * * * *